Dec. 25, 1951 R. B. MUCHMORE 2,579,751

HIGH-FREQUENCY BRIDGE CIRCUIT

Filed Nov. 26, 1948

INVENTOR
ROBERT B. MUCHMORE
BY
Paul B. Hunter
ATTORNEY

Patented Dec. 25, 1951

2,579,751

UNITED STATES PATENT OFFICE 2,579,751

HIGH-FREQUENCY BRIDGE CIRCUIT

Robert B. Muchmore, Hawthorne, Calif., assignor to The Sperry Corporation, Great Neck, N. Y., a corporation of Delaware Application November 26, 1948, Serial No. 62,047

4 Claims. (Cl. 178—44)

This invention relates to improvements in radio and higher frequency bridge circuits, a bridge circuit being defined as a network having conjugate pairs of terminals which are effectively isolated from each other when the impedances connected to certain terminals are equal or balanced.

Conventional Wheatstone bridge circuits and hybrid coils or transformers are unsatisfactory at high radio frequencies, particularly for measurement purposes, owing to stray reactance and radiation from the bridge elements. Careful shielding is effective at moderately high frequencies, but at the higher frequencies it is found that intolerably high losses occur in lumped-circuit networks with shields.

At the extremely high frequencies characteristic of the so-called "microwave" portion of the electromagnetic spectrum, the functions of bridge circuits may be effected conveniently by wave guide networks of the hybrid tee or "magic tee" type. At somewhat lower frequencies, which are nevertheless too high for conventional bridge circuits to be practical, wave guides must be undesirably large in order to be above the minimum size for low frequency cutoff. Transmission line networks such as rings or "rat races" are used at these frequencies, since a two conductor line is not limited by a low frequency cutoff and can be reasonably small.

The usual prior art transmission line bridge circuit includes one or more line sections whose length depends upon the frequency at which the bridge is to be used. At frequencies other than the design frequency, the line sections are too long or too short, and the impedances presented by the bridge at its various terminals are not of the intended values. Another, and probably much more serious difficulty, is that the balance characteristics of the circuit depend upon the line lengths and thus the circuit may not act like a bridge at all at frequencies not close to the design frequency.

One of the principal objects of the instant invention is to provide improved radio frequency bridge circuits which may be of reasonably small physical size when designed for use in the comparatively longer wavelength part of the microwave spectrum, and lower frequencies.

Another important object is to provide bridge circuits wherein the balance characteristics depend only upon mechanical symmetry and thus are independent of frequency.

A further object of this invention is to provide bridge circuits which fulfill the foregoing objects and in addition are electrically and mechanically simple, rugged, and easy to construct with the required degree of symmetry.

The invention will be described with reference to the accompanying drawing wherein.

Figures 1, 2, 2A, 3:
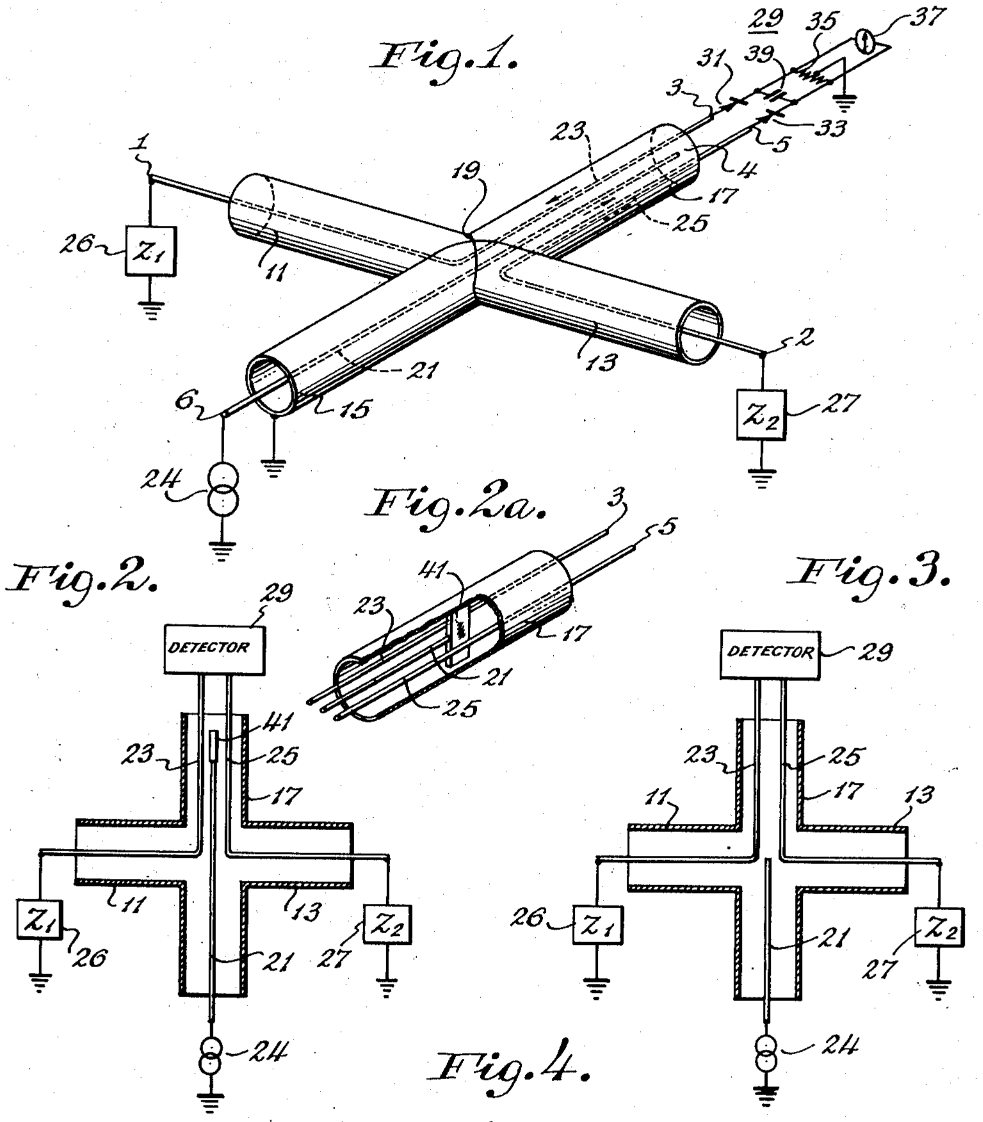
Fig. 1 is a perspective view of an enclosed transmission line bridge structure embodying the invention.
Fig. 2 is a plan view in section of a modification of the structure of Fig. 1.

Fig. 2*a* is a perspective view of a part of the device of Fig. 2, with the outer sheath broken to show internal details;

Fig. 3 is a schematic drawing of another modification; and

Figure 4:
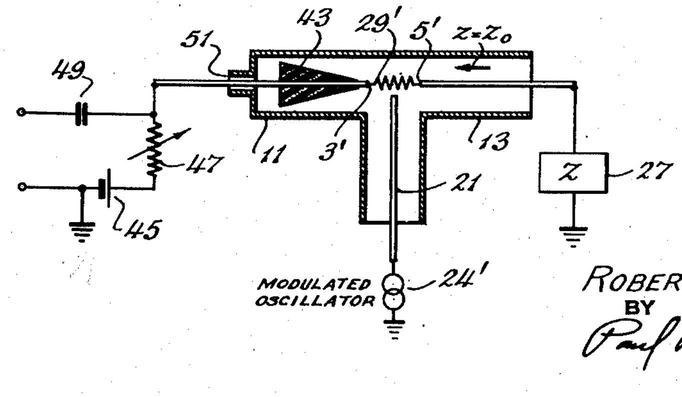

Fig. 4 is a schematic drawing of a further embodiment of the invention in a reflectometer system.

The device shown in Fig. 1 includes two coaxial line sections 11 and 13 in alignment with each other and with the near ends of their outer conductors or sheaths joined together and to the ends of two further similar sheaths 15 and 17 at a common junction 19. An inner conductor 21 extends into the sheath 15 and through the junction of the sheaths into the sheath 17. The inner conductors of the line sections 11 and 13 extend around the interior of the junction 19 and through the sheath 17 as shown at 23 and 25 respectively, parallel to and on opposite sides of the conductor 21. The inner conductor 21 may terminate at a point 4 in the vicinity of the end of the sheath 17.

The structure is physically symmetrical about a plane through the axis of the sheaths 15 and 17 and perpendicular to that of the lines 11 and 13. This type of symmetry is believed to be necessary to the performance of the device as a bridge, although it is not essential that the sheaths 15 and 17 be collinear, and probably not a requisite that the lines 11 and 13 be collinear, as long as the planes defined by the non-collinear lines 11 and 13 and the sheaths 15 and 17 respectively intersect at right angles. However, it is preferred at present to make both lines 11 and 13 perpendicular to both sheaths 15 and 17, as shown in Fig. 1.

In a typical application the bridge device of Fig. 1, a source 24 of radio or microwave energy is connected to the outer end 6 of the coaxial line formed by the conductors 15 and 21, and impedances 26 and 27 are connected to the ends 1 and 2 of the lines 11 and 13 respectively. A balanced detector 29 is connected to the ends 3 and 5 of the conductors 23 and 25, near the end of the sheath 17.

The detector 29 may comprise a pair of diodes or crystals 31 and 33 connected between the terminals 3 and 5 and the respective ends of a center-tapped resistor 35. The center-tap of the resistor 35 is grounded, and a direct current meter such as a galvanometer 37 is connected across the resistor 35. The resistor and meter are shunted by a capacitor 39.

In the operation of the system of Fig. 1, energy from the source 24 travels down the line 21, 15 toward the point 4. Some of this energy is transferred to each of the conductors 23 and 25 by way of capacitive coupling, the capacitance being distributed along the conductors 23 and 25, and by way of inductive coupling, whereby the charging currents flowing along the conductor 21 induce corresponding currents in the conductors 23 and 25. One or the other type of coupling may predominate, depending upon the wavelength and upon the dimensions of the various elements; regardless of the exact quantitative relationship, it will be apparent that as long as the structure is physically symmetrical, and the inner conductors 23 and 25 are terminated symmetrically at their respective ends, equal currents of the same instantaneous polarities will be induced therein.

For this condition to exist, it is necessary not only that the detector 29 be balanced with respect to ground, but also that the impedances $Z_1$ and $Z_2$ of the elements 26 and 27 be identical. In this event, equal currents will flow through the rectifiers 31 and 33, producing equal direct currents to ground in the two halves of the resistor 35. The voltage drops across the two halves of the resistor will be equal and opposed, and no current will flow in the meter 37.

Now if either of the impedances $Z_1$ and $Z_2$ is changed, or another impedance of different value substituted for one of them, the currents induced in the conductors 23 and 25 will no longer be equal. The outputs of the rectifiers, and hence the voltage drops on the two halves of the resistor 35, will differ. The meter 37 will show a deflection in one direction or the other, indicating unbalance between the two impedances connected to the terminals 1 and 2.

It will be apparent that the bridge structure of Fig. 1 may be used in various other circuit arrangements where balance characteristics are required. For example, a push pull oscillator, balanced to ground, may be connected to the terminals 3 and 5 and an unbalanced detector (with one input terminal grounded) may be connected to the terminal 6. In this case, the detector would receive none of the oscillator output as long as the impedances $Z_1$ and $Z_2$ were identical. As another example, balanced sources (on a single source balanced to ground) can be connected to the terminals 1 and 2, and an unbalanced detector connected to the terminal 6. Equal impedances connected from the terminals 3 and 5 respectively to ground would produce no output to the detector, while inequality between impedances so connected would produce output. Thus, as in other types of bridge circuits, the connections to various conjugate terminals may be interchanged. It should be noted that in any of the above mentioned arrangements, the balance characteristics depend only upon the physical symmetry of the bridge device, and thus are not a function of frequency.

The nature of the coupling between the conductor 21 and the conductors 23 and 25 can be controlled to some extent by the termination of the conductor 21 within the sheath 17. Referring to Figs. 2 and 2*a* for example, the conductor 21 terminates within the sheath 17 at a transverse conductor or fin 41 to which it is connected and which in turn is connected to the inner wall of the sheath, extending between and symmetrically with respect to the conductors 23 and 25. A wire conductor could be used in lieu of fin 41, if desired.

The operation of the device of Fig. 2 is like that of Fig. 1, except that the mode of coupling may be different, being principally inductive or capacitive depending upon the frequency and the distance of the fin 41 from the junction. Moreover, the fin 41 may be made of resistive material such that it terminates the conductor 21 in an impedance match throughout a frequency band, whereupon the sensitivity of the bridge to unbalance will be substantially constant over said band.

The structure shown schematically in Fig. 3 is like that of Fig. 1, except that the conductor ends at a point near the center of the junction. This arrangement also operates like that of Fig. 1 as far as balance is concerned, the principal difference being that the coupling in Fig. 3 is primarily capacitive.

Fig. 4 shows a device similar to that of Fig. 3, but omitting the sheath 17 and the conductors 23 and 25. In this arrangement, a balanced detector 29′ may be connected within the junction between the ends 3′ and 5′ of the inner conductors of the lines 11 and 13 respectively. The coupling from the conductor 21 to the lines 11 and 13 is principally capacitive, and equal voltages to ground appear at the points 3′ and 5′ as long as the lines 11 and 13 and their terminations are balanced.

The detector 29′ in this instance may be a small resistance element whose resistance is a function of temperature. Any difference in voltage between the terminals 3′ and 5′ will cause current to flow, heating the resistance element and changing its resistance. In the use of the system of Fig. 4 as a reflectometer, a matching device 43, such as a tapered body of resistance material is included in the line 11, and bias current for the detector 29′ is supplied through the center conductors from a battery 45.

It is assumed that the test load 27 has a D.-C. return path for the bias current. The source 24′ may be square-wave modulated at a frequency of, for example, 400 cycles per second. A resistor 47 serves to control the bias current and also acts as an audio frequency load, being coupled through a blocking condenser 49 to an A.-C. indicator, not shown.

When the test load 27 matches the line 13, the radio frequency voltages at the terminals 3′ and 5′ are equal. The resistance of the device 29′ depends upon the bias current supplied by the battery 45, and does not vary. If the test load 27 does not match the line 13, the R.-F. voltages at the points 3′ and 5′ are unequal, and a radio frequency component is superimposed on the bias current in the element 29′. Since this current is modulated, the resistance will vary at the modulation frequency. The current drawn from the battery 45 will vary accordingly, as will the voltage drop across the load resistor 47. The resulting 400 cycle voltage will be coupled through the capacitor 49 to the indicator, and its amplitude will be a measure of the degree of mismatch between the load 27 and the line 13. A small coaxial by-pass condenser 51 prevents any substantial amount of radio frequency energy from reaching the indicator. Providing the matching device 43 is designed to be effective over a band of frequencies, the standing wave ratio of the test load 27 as a function of frequency may be determined by varying the carrier frequency of the source 27'.

What is claimed is:

1. A radio frequency bridge device, including two coaxial transmission line sections with the proximate ends of their outer conductors abutting and joined, a third outer conductor joined at the junction thereof to said first two outer conductors, the inner conductors of said first mentioned lines being continued through said junction and in symmetrical relationship to each other through said third outer conductor and parallel to the axis thereof, a further coaxial line with its outer conductor joining said other outer conductors at said junction, the inner conductor of said further coaxial line extending through said junction into said third outer conductor, and means short-circuiting said inner conductor to said third outer conductor.

2. The invention as set forth in claim 1, wherein said means short-circuiting said inner conductor to said third outer conductor is at a point which is of the order of one quarter wavelength beyond said junction.

3. A radio frequency bridge device, including two coaxial transmission line sections having a common axis and the proximate ends of their outer conductors abutting and joined, a third outer conductor joined at the junction thereof to said first two outer conductors and extending at right angles thereto from said junction, the inner conductors of said first mentioned lines being continued through said junction and in symmetrical relationship to each other into and through said third outer conductor and parallel to the axis thereof, and a further coaxial line with its outer conductor joining said other outer conductors at said junction and extending at right angles to said two first mentioned lines, the inner conductor of said further coaxial line extending into said junction midway between said inner conductors of said first mentioned lines, and conductive means connecting said further inner conductor to said third outer conductor in the plane of symmetry between said first and second inner conductors.

4. A radio frequency bridge device, including two coaxial transmission line sections with the proximate ends of their outer conductors joined, a third outer conductor joined at the junction thereof to said first two outer conductors, the inner conductors of said first mentioned lines extending through said junction and through said third outer conductor and parallel to the axis thereof, a further coaxial line with its outer conductor joined to said other outer conductors at said junction and its inner conductor extending through said junction and into said third outer conductor along the axis thereof, and means including a member of resistive material within said outer conductor connecting said last mentioned inner conductor to said third outer conductor.

ROBERT B. MUCHMORE.

REFERENCES CITED

The following references are of record in the file of this patent:

UNITED STATES PATENTS

| Number | Name | Date |
|---|---|---|
| 2,441,574 | Jaynes | May 18, 1948 |
| 2,445,895 | Tyrrell | July 27, 1948 |
| 2,454,907 | Brown | Nov. 30, 1948 |
| 2,456,679 | Cork et al. | Dec. 21, 1948 |
| 2,458,577 | Evans | Jan. 11, 1949 |
| 2,527,979 | Woodward | Oct. 31, 1950 |